W. P. WAUGH.
GLAZING CONSTRUCTION.
APPLICATION FILED SEPT. 21, 1915.
1,227,861. Patented May 29, 1917.
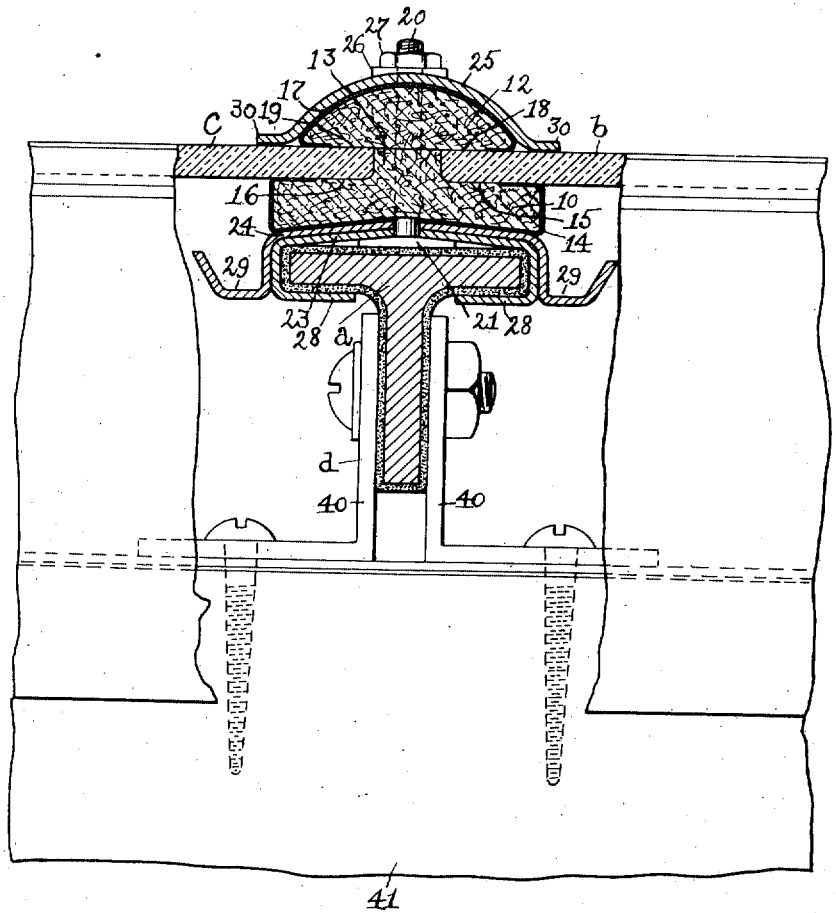
Inventor:
William P. Waugh
by Jas. H. Churchill
Atty.

UNITED STATES PATENT OFFICE.

WILLIAM P. WAUGH, OF WARREN, RHODE ISLAND, ASSIGNOR TO ASBESTOS PROTECTED METAL COMPANY, OF PITTSBURGH, PENNSYLVANIA, A CORPORATION OF PENNSYLVANIA.

GLAZING CONSTRUCTION.

1,227,861.  Specification of Letters Patent.  Patented May 29, 1917.

Application filed September 21, 1915. Serial No. 51,887.

*To all whom it may concern:*

Be it known that I, WILLIAM P. WAUGH, a citizen of the United States, residing in Warren, in the county of Bristol and State of Rhode Island, have invented an Improvement in Glazing Construction, of which the following description, in connection with the accompanying drawings, is a specification, like characters on the drawings representing like parts.

This invention relates to a novel glazing construction, which is especially adapted among other uses to be employed in the construction of skylights, saw-tooth fronts, and monitor or other sash.

The invention has for its object to provide a glazing construction, which is highly efficient, inexpensive, easy to assemble, moisture and gas proof and durable.

In accordance with this invention, the panes of glass, are sealed on the upper and lower surfaces and preferably at their adjacent edges by substantially plastic or moldable material, which is water-repelling, non-absorbing and resilient, such as asphalt or bituminous compositions, which material is capable of filling the minute cavities or depressions in the wavy or irregular surfaces of the glass panes and of adhering thereto and thereby forms an effective seal on the upper and lower surfaces of said glass, and prevents the passage of moisture, gases, etc., from the upper to the lower surfaces of the glass. Provision is made for protecting the asphalt sealing members from the action of light, heat, air, gases, etc., whereby the usefulness of the sealing material is materially prolonged.

The asphalt members also serve to yieldingly support the glass and relieve the latter from strain or shock, and further take care of the expansion and contraction of the glass. The asphalt member above the glass may and preferably will be made of sufficient size to form an efficient support for a cap plate and to substantially fill the same, for a purpose as will be described.

Provision is made for attaching the asphalt members to a supporting member at a minimum expense and without the necessity of tapping into the supporting member, which latter is preferably made as a steel bar provided with a protective layer of asbestos adhesively secured thereto.

Provision is also made for providing a gutter member for water of condensation, as will be described.

These and other features of this invention will be pointed out in the claims at the end of this specification.

The drawing represents in section and elevation a sufficient portion of a skylight construction to enable the invention to be understood.

Referring to the drawing, $a$ represents a supporting member for adjacent panes $b$, $c$ of glass, and is herein shown as a T-bar provided with a covering layer $d$ of asbestos paper or felt, which is adhesively secured to the metal bar, preferably by asphalt cement.

The glass panes $b$, $c$, are sealed on their upper and lower surfaces by substantially plastic sealing members 10, 12, of asphalt or bituminous compositions, which material is moisture-repellent, non-absorbing and resilient, and therefore especially useful for this purpose.

The sealing members 10, 12, are preferably made separate, and one of said members as 10, may and preferably will be provided with a rib 13, which is designed to extend between the panes of glass $b$, $c$, and is made of sufficient depth to enable it to contact with the other member 12 and be intimately united or bonded thereto by pressure as will be described.

The asphalt member 10 may and preferably will be provided with a protective layer 14 of fibrous material, preferably asbestos paper or felt, which covers the bottom, sides, and a portion of the upper surface of the asphalt member 10, leaving portions of said upper surface, marked 15, 16, uncovered, so as to contact with and adhere to the under surfaces of the glass panes $b$, $c$, and form the seals proper therefor.

The upper asphalt sealing member 12 is provided with a similar protective layer 17, which covers a portion only of the lower surface of the asphalt member 12 and leaves portions of the lower surface, marked 18, 19, uncovered, so as to contact with and adhere to the upper surfaces of the glass panes and form the seals proper therefor. The substantially plastic nature of the asphalt sealing members enables it to fill the minute cavities, depressions or irregularities in the surfaces of the glass panes $b$, $c$, and adhere thereto and thereby most effectively seal the said surfaces against the passage of moisture, gases, etc., from the exposed outer to the inner surfaces of the glass panes, and the effective surfaces of the substantially plastic sealing members are maintained in effective condition by the asbestos or other protectors 14, 17, which shield the sealing members and particularly the seals proper 15, 16, 18, 19, against deterioration by external influences, such as gases, light, air, etc. It will thus be seen that each pane of glass is provided with an effective seal of bituminous material, which is protected against deterioration by external influences.

The sealing members 10, 12, are secured in fixed relation to the supporting member $a$, which may and preferably will be effected as herein shown, by means of bolts 20, which are suitably spaced apart, preferably about twelve inches, and each bolt 20 is provided with a substantially large head 21, which is flat on its underside so as to rest on the supporting member $a$ and afford a broad or substantial bearing, for a purpose as will be described.

The bolts 20 are secured in fixed relation to the supporting member $a$ without the necessity of tapping into the said member, and, in the present instance, they are passed up through suitable holes in clamping plates or strips 23 and through a gutter plate 24, and are also passed up through the plastic sealing members 10, 12, and a cap plate or strip 25, and provided above the latter with a washer 26 and nut 27.

The clamping plate or strip 23 has its sides or ends 28 bent under the head of the supporting member $a$. The gutter plate 24 is bent at its sides to form gutters 29, which serve to catch moisture of condensation.

The cap plate 25 is preferably made curved and shallow for the greater portion of its width, as herein shown, and is provided with substantially flat narrow side portions 30, which rest upon the glass panes $b$, $c$, and the cap plate for the greater portion of its width bears upon the sealing member 12, so that when the nut 27 is turned up, the greater pressure of the cap plate is taken care of and distributed by the substantially plastic sealing member 12, and a broad and uniform bearing for the cap plate is obtained without subjecting the glass panes to severe and objectionable strains.

It is preferred to make the sealing member 12 of sufficient size to fill or substantially fill the space between the cap plate and the glass panes, thereby avoiding hollow spaces within or under the cap plate into which water or dirt can enter or within which water of condensation can form, and in this manner effectively prolong the life of the structure.

The plastic or substantially plastic nature of the sealing members, enables them to effectively bond with or unite to the bolts 20 and seal the same against leakage of moisture or gases along the bolts, and the openings in the cap plate through which the bolts 20 pass are also filled and sealed by the plastic material of the sealing members, when pressure is applied to the cap plate by turning up the nut 27. It will also be observed that the wide heads of the bolts are supported by the member $a$ and have such a large bearing on said member, that heavy planks can be supported upon the bolts above the cap plate, to facilitate cleaning of the glass panes, without putting any extra pressure upon the glass panes, and thereby avoiding liability of cracking or breaking the glass panes when this work is being performed.

The supporting member $a$ is preferably provided with the protective covering $d$ of asbestos, but it is not desired to limit the invention in this respect, as it may be painted or left exposed so far as the deleterious effects of external air, gases, etc., are concerned, as these are most effectively prevented from reaching the supporting member by the sealing members 10, 12.

It may be preferred to employ the rib 13 on one of the sealing members and to make the same of sufficient width to contact with and seal the adjacent edges of the glass panes $b$, $c$, and also to act as a cushion against lateral movement of said panes, but it is not desired to limit the invention in this respect.

It may be and is preferred to make the seals proper which contact with the glass, as part of two plastic bodies, which are protected on their exposed surfaces, but it is not desired to limit the invention in this respect, as it is believed that it is new to provide seals of plastic, water-repelling material for the opposite surfaces of each glass pane and protect the seals against external influences.

The supporting member $a$ may be secured to the roof or other structure in any suitable manner, and, in the present instance, it is shown as fastened to angle irons 40 which are fastened to purlins 41.

Claims.

1. In a glazing construction, in combination, a sealing member of substantially plastic, water-repelling material provided on its outer surface with protective means, glass panes resting on said sealing member and said protective means and separated from each other, a second sealing member of substantially plastic, water-repelling material contacting with the upper surfaces of said glass panes, and provided with a protective means on its outer surface having a portion interposed between the second sealing member and the glass panes, a rib of substantially plastic, water-repelling material filling the space between the edges of the glass panes and united with said sealing members between said glass panes, a cap plate covering the upper sealing member, a supporting member located below said panes, and means for securing said cap plate in fixed relation to said supporting member, said means being extended through said sealing members and rib to be sealed thereby below, between, and above said panes.

2. In a glazing construction, in combination, glass panes located in substantially the same plane and separated from each other, asphalt sealing members contacting with the opposite surfaces of said glass panes and connected by an asphalt rib interposed and filling the space between the adjacent edges of said panes, a supporting member for said panes located below the same, a cap plate covering the upper sealing member, and means for securing said cap plate in fixed relation to said supporting member, said means being extended through the sealing members and rib and sealed by the latter between the glass panes.

3. A glazing structure comprising a plastic packing provided with a restraining fabric covering having its boundary edges interposed between a portion of said packing and the glass, leaving a portion of said plastic packing contacting directly with the glass, and rigid members substantially coextensive with the principal surfaces of said packing, and means to press said rigid members to bring the plastic material in close contact with the glass to seal the edges thereof.

In testimony whereof, I have signed my name to this specification.

WILLIAM P. WAUGH.